US012250281B2

(12) United States Patent
Hyndman (10) Patent No.: US 12,250,281 B2
(45) Date of Patent: Mar. 11, 2025

(54) PROXY AUTOMATIONS FOR MULTI-TENANT INFRASTRUCTURES

(71) Applicant: International Business Machines Corporation, Armonk, NY (US)

(72) Inventor: Arn Hyndman, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/215,703

(22) Filed: Jun. 28, 2023

(65) Prior Publication Data

US 2025/0007997 A1   Jan. 2, 2025

(51) Int. Cl.
*H04L 67/561* (2022.01)

(52) U.S. Cl.
CPC .................. *H04L 67/561* (2022.05)

(58) Field of Classification Search
CPC .................................. H04L 67/561
USPC ........................................ 709/203
See application file for complete search history.

(56) References Cited

U.S. PATENT DOCUMENTS

| 10,884,732 | B1 | 1/2021 | Zolotow et al. | |
| 11,924,284 | B1* | 3/2024 | Hanson | H04L 67/133 |
| 2012/0144187 | A1* | 6/2012 | Wei | H04L 63/168 |
| | | | | 713/152 |
| 2014/0201218 | A1* | 7/2014 | Catalano | H04L 47/803 |
| | | | | 707/748 |
| 2020/0259922 | A1* | 8/2020 | Shim | H04L 63/0876 |
| 2020/0387357 | A1 | 12/2020 | Mathon et al. | |
| 2022/0021580 | A1* | 1/2022 | Aoki | H04L 41/5051 |
| 2022/0229637 | A1* | 7/2022 | Benassi | G06F 8/315 |
| 2022/0283788 | A1 | 9/2022 | White, III et al. | |
| 2022/0350902 | A1* | 11/2022 | Buscaglia | G06F 16/2448 |

* cited by examiner

*Primary Examiner* — Wing F Chan
*Assistant Examiner* — John Fan
(74) *Attorney, Agent, or Firm* — Zilka Kotab, P.C.

(57) ABSTRACT

A computer-implemented method, according to one embodiment, includes: generating a proxy automation on a multi-tenant infrastructure using an application onboarding automation. A new automation configured is also generated to adjust settings of the application onboarding automation based on inputs received in response to running the proxy automation, and inputs are received in response to the proxy automation being run for an application. The received inputs and the new automation are used to adjust settings of the application onboarding automation. Furthermore, the application is implemented on the multi-tenant infrastructure by performing the adjusted application onboarding automation at the multi-tenant infrastructure.

20 Claims, 5 Drawing Sheets

PROXY AUTOMATIONS FOR MULTI-TENANT INFRASTRUCTURES

BACKGROUND

The present invention relates to multi-tenant infrastructures, and more specifically, this invention relates to implementing proxy automations for application onboarding in multi-tenant infrastructures.

The increased amount of data collected from sensors and IoT devices has changed how and where the data is actually processed. For instance, traditional computing devices have implemented unique combinations of physical components (e.g., designs) in order to achieve desired functionality. In one example, different types of compute modules may be combined to create a cloud compute environment that is physically designed for a specific type of anticipated workload.

While this results in systems that are fine tuned for specific types of tasks, these specialized systems can only be deployed in a narrow range of situations. Traditional devices thereby have limited applicability, leading to unstable systems that are prone to experiencing downtime and latency.

SUMMARY

A computer-implemented method, according to one embodiment, includes: generating a proxy automation on a multi-tenant infrastructure using an application onboarding automation. A new automation configured is also generated to adjust settings of the application onboarding automation based on inputs received in response to running the proxy automation, and inputs are received in response to the proxy automation being run for an application. The received inputs and the new automation are used to adjust settings of the application onboarding automation. Furthermore, the application is implemented on the multi-tenant infrastructure by performing the adjusted application onboarding automation at the multi-tenant infrastructure.

A computer program product, according to another embodiment, includes a computer readable storage medium having program instructions embodied therewith. The program instructions readable by a processor, executable by the processor, or readable and executable by the processor, to cause the processor to: perform the foregoing method.

A system, according to yet another embodiment, includes: a multi-tenant infrastructure having infrastructure as code, and a processor. The system also includes logic integrated with the processor, executable by the processor, or integrated with and executable by the processor, the logic being configured to: perform the foregoing method.

Other aspects and embodiments of the present invention will become apparent from the following detailed description, which, when taken in conjunction with the drawings. illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for implementing proxy automations for application onboarding in multi-tenant infrastructures. Accordingly, implementations herein are able to onboard applications at the multi-tenant infrastructures faster and more streamlined than conventionally achievable, e.g., as will be described in further detail below.

In one general embodiment, a computer-implemented method includes: generating a proxy automation on a multi-tenant infrastructure using an application onboarding automation. A new automation configured is also generated to adjust settings of the application onboarding automation based on inputs received in response to running the proxy automation, and inputs are received in response to the proxy automation being run for an application. The received inputs and the new automation are used to adjust settings of the application onboarding automation. Furthermore, the application is implemented on the multi-tenant infrastructure by performing the adjusted application onboarding automation at the multi-tenant infrastructure.

In another general embodiment, a computer program product includes a computer readable storage medium having program instructions embodied therewith. The program instructions readable by a processor, executable by the processor, or readable and executable by the processor, to cause the processor to: perform the foregoing method.

In yet another general embodiment, a system includes: a multi-tenant infrastructure having infrastructure as code, and a processor. The system also includes logic integrated with the processor, executable by the processor, or integrated with and executable by the processor, the logic being configured to: perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
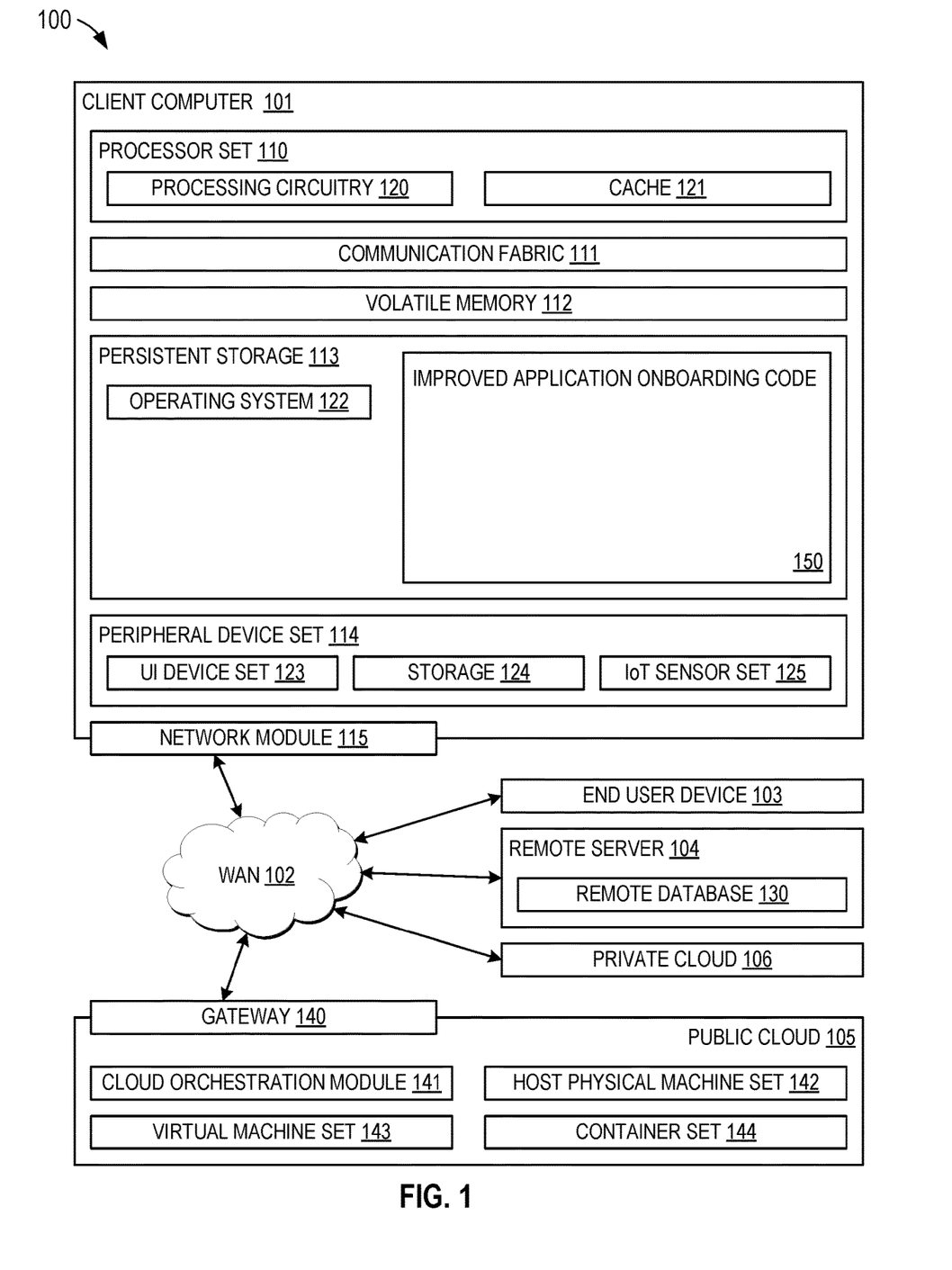
FIG. 1 is a diagram of a computing environment, in accordance with one embodiment.

Computing environment 100 contains an example of an environment for the execution of at least some of the computer code involved in performing the inventive methods, such as improved application onboarding code at block 150 for implementing proxy automations for application onboarding in a multi-tenant infrastructure of a distributed system. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

Figure 2:
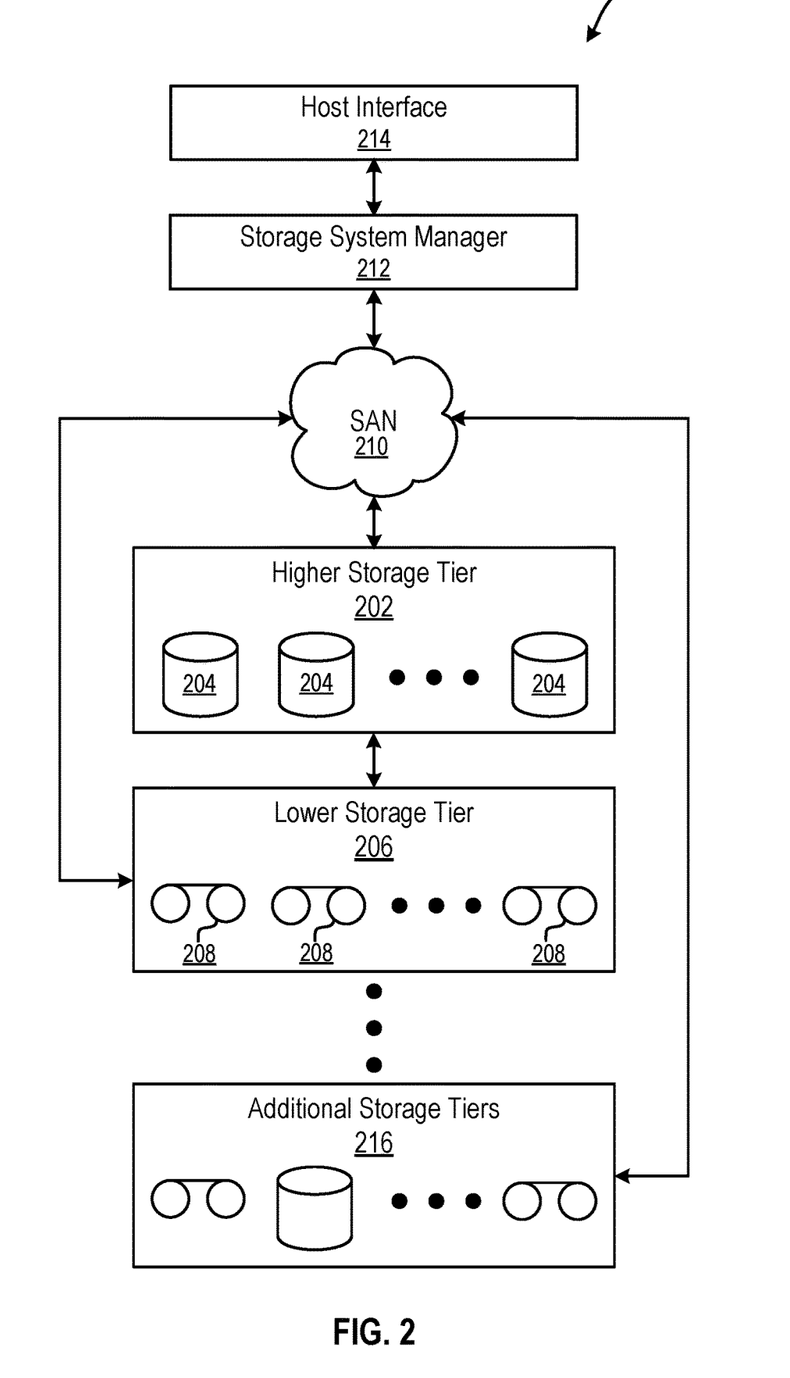
FIG. 2 is a diagram of a tiered data storage system, in accordance with one embodiment.

Now referring to FIG. 2, a storage system 200 is shown according to one embodiment. Note that some of the elements shown in FIG. 2 may be implemented as hardware and/or software, according to various embodiments. The storage system 200 may include a storage system manager 212 for communicating with a plurality of media and/or drives on at least one higher storage tier 202 and at least one lower storage tier 206. The higher storage tier(s) 202 preferably may include one or more random access and/or direct access media 204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 206 may preferably include one or more lower performing storage media 208, including sequential access media such as magnetic tape in tape drives and/or optical media, slower accessing HDDs, slower accessing SSDs, etc., and/or others noted herein or known in the art. One or more additional storage tiers 216 may include any combination of storage memory media as desired by a designer of the system 200. Also, any of the higher storage tiers 202 and/or the lower storage tiers 206 may include some combination of storage devices and/or storage media.

The storage system manager 212 may communicate with the drives and/or storage media 204, 208 on the higher storage tier(s) 202 and lower storage tier(s) 206 through a network 210, such as a storage area network (SAN), as shown in FIG. 2, or some other suitable network type. The storage system manager 212 may also communicate with one or more host systems (not shown) through a host interface 214, which may or may not be a part of the storage system manager 212. The storage system manager 212 and/or any other component of the storage system 200 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 200 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 202, may include a majority of SSD storage media for storing data in a higher performing storage environment, and remaining storage tiers, including lower storage tier 206 and additional storage tiers 216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 202, while data not having one of these attributes may be stored to the additional storage tiers 216, including lower storage tier 206. Of course, one of skill in the art, upon reading the present descriptions, may devise many other combinations of storage media types to implement into different storage schemes, according to the embodiments presented herein.

According to some embodiments, the storage system (such as 200) may include logic configured to receive a request to open a data set, logic configured to determine if the requested data set is stored to a lower storage tier 206 of a tiered data storage system 200 in multiple associated portions, logic configured to move each associated portion of the requested data set to a higher storage tier 202 of the tiered data storage system 200, and logic configured to assemble the requested data set on the higher storage tier 202 of the tiered data storage system 200 from the associated portions.

It follows that storage system 200 is able to use different types of memory to implement different levels of performance. For instance, the storage system manager 212 is used to control where data is processed and/or stored in the system 200, where each location is capable of achieving a different outcome. Similarly, FIG. 3 below shows a system 300 having a multi-tenant (shared) infrastructure 302 that can be used to implement a number of different applications (e.g., software programs), e.g., as described in further detail below.

As noted above, traditional computing devices have implemented unique combinations of physical components (e.g., designs) in order to achieve desired functionality. In one example, different types of compute modules may be combined to create a cloud compute environment that is physically designed for a specific type of anticipated workload. Again, while this results in systems that are fine tuned for specific types of tasks, these specialized systems can only be deployed in a narrow range of situations. Traditional devices thereby have limited applicability, leading to unstable systems that are prone to experiencing downtime and latency.

In sharp contrast to these conventional issues, embodiments herein implement infrastructure as code to manage multi-tenant infrastructures. In other words, implementations herein are able to manage and provision shared computer data centers using machine-readable definition files, rather than exclusively using physical hardware configurations and/or interactive configuration tools as seen in conventional products.

It should also be noted that performance of the embodiments herein is further improved by implementing multiple different applications at the multi-tenant infrastructure. Depending on the approach, between 10 and 20 different applications may be implemented on the multi-tenant infrastructure to fully utilize the compute power at the multi-tenant infrastructure. For instance, distributing a multi-tenant infrastructure across many applications can produce significant cost savings in terms of infrastructure, operation, compliance, etc. However, the number of applications onboarded at a multi-tenant infrastructure may vary depending on the size and other characteristics of the multi-tenant infrastructure.

Figure 3:
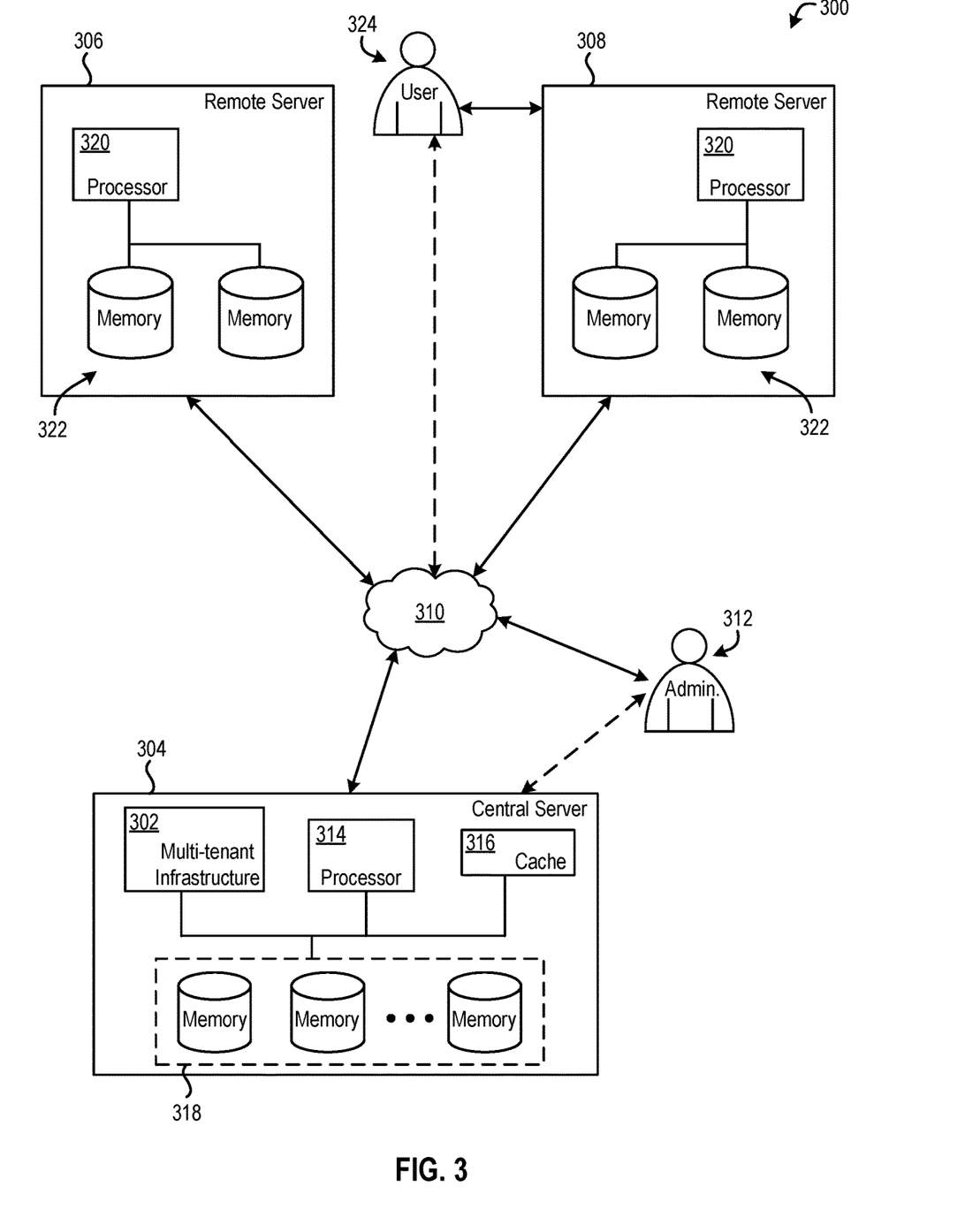
FIG. 3 is a diagram of a distributed system, in accordance with one embodiment.

Looking now to FIG. 3, a system 300 having a multi-tenant infrastructure 302 is shown in accordance with one embodiment. As an option, the present system 300 may be implemented in conjunction with features from any other embodiment listed herein, such as those described with reference to the other FIGS., such as FIGS. 1-2. However, this system 300 and others presented herein may be used in various applications and/or in permutations which may or may not be specifically described in the illustrative embodiments listed herein. Further, the system 300 presented herein may be used in any desired environment. Thus FIG. 3 (and the other FIGS.) may be deemed to include any possible permutation.

As shown, the multi-tenant infrastructure 302 is located at a central server 304 (e.g., compute location) which is connected to remote servers 306, 308 over network 310. An administrator 312 of the multi-tenant infrastructure 302 and/or central server 304 itself is also shown as being connected to network 310. In some implementations, the administrator 312 may be directly connected to the central server 304 as represented by the dashed arrowed line. It follows that the administrator 312 may be able to control at least a portion of the central server 304, e.g., such as the multi-tenant infrastructure 302.

It should also be noted that "connected" and "communicate" as used herein are intended to refer to any desired connection between two points that allows for the exchange of information therebetween. In other words, data, instructions, commands, responses, user inputs, etc. may be sent between any two or more locations (components) that are able to communicate with each other as a result of being connected to each other, e.g., as would be appreciated by one skilled in the art after reading the present description.

For instance, the network 310 may be of any type, e.g., depending on the desired approach. For instance, in some approaches the network 310 is a WAN, e.g., such as the Internet. However, an illustrative list of other network types which network 310 may implement includes, but is not limited to, a LAN, a PSTN, a SAN, an internal telephone network, etc. Accordingly, the central server 304 and the remote servers 306, 308 are able to communicate with each other regardless of the amount of separation which exists therebetween, e.g., despite being positioned at different geographical locations.

In addition to the multi-tenant infrastructure 302, the central server 304 includes a large (e.g., robust) processor 314 coupled to a cache 316 and a data storage array 318 having a relatively high storage capacity. The central server 304 is thereby able to process and store a relatively large amount of data, allowing it to be connected to and communicate with multiple different remote servers. As noted above, the central server 304 may receive data, commands, etc. from any number of locations. The components included in the central server 304 thereby preferably have a higher achievable throughput than components included in each of the remote servers 306, 308, to accommodate the higher flow of data experienced at the central server 304.

It should be noted that with respect to the present description, "data" may include any desired type of information. For instance, in different implementations data can include raw sensor data, metadata, program commands, instructions, etc. It follows that the processor 314 may use the cache 316 and/or storage array 318 to actually cause one or more data operations to be performed. According to an example, the processor 314 at the central server 304 may be used to manage the multi-tenant infrastructure 302, e.g., by performing one or more operations of method 400 of FIG. 4A, e.g., as will be described in further detail below.

With continued reference to FIG. 3, each of the remote servers 306, 308 include a processor 320 coupled to memory 322. While the remote servers 306, 308 are depicted as including similar components and/or construction, it should be noted that any desired components may be implemented in any desired arrangement. In some instances, each remote server location in a system may be configured differently to provide each location with a different ability. According to an example, which is in no way intended to limit the invention, remote server 306 may include a cryptographic module (not shown) that allows the remote server 306 to produce encrypted data, while remote server 308 includes a data compression module (not shown) that allows the remote server 308 to produce compressed data.

It follows that the different servers (e.g., compute locations) in system 300 may have different performance capabilities. As noted above, the central server 304 may have a higher achievable throughput compared to the remote servers 306, 308. While this may allow the central server 304 the ability to perform more data operations in a given amount of time than the remote servers 306, 308, other factors impact achievable performance. For example, traffic over network 310 may limit the amount of data that may be sent between the different servers 304, 306, 308. The workload experienced at a given time also impacts latency and limits achievable performance.

A user 324 is also connected to remote server 308. In some approaches, the user 324 connects to the remote server 308 through a compute device (e.g., such as the user's personal computer, mobile phone, etc.) such that information can be exchanged therebetween. However, in other approaches the user 324 may be able to access the remote server 308 using one or more terminals having a user interface. The user 324 may also be connected to the network 310 in some implementations. Accordingly, the user 324 may access remote server 308 and/or other locations in system 300 through the network 310 in such implementations. In still other implementations, the user may be able to access network 310 through a direct connection to the remote server 308, e.g., as would be appreciated by one skilled in the art after reading the present description.

It follows that remote servers 306, 308 are able to access the multi-tenant infrastructure 302 at the central server 304. As noted above, the multi-tenant infrastructure 302 provides compute resources that may be used by the remote servers 306, 308 to run (e.g., perform) applications or other types of software. For instance, the multi-tenant infrastructure includes infrastructure as code in preferred implementations. This allows for the multi-tenant infrastructure to design, implement, and deploy application infrastructure, e.g., as would be appreciated by one skilled in the art after reading the present description.

Infrastructure as Code (IaC) automates the provisioning of infrastructure, enabling an organization to develop, deploy, and scale cloud applications with greater speed, less risk, and reduced cost. "Terraform" is an open-source example of a declarative IaC tool that allows for automation of the provisioning for all aspects of an enterprise cloud-based and on-premises infrastructure. Terraform is able to interface with various cloud providers and also allows for automation of build-out of resources across multiple providers in parallel, regardless of where physical servers, DNS servers, or databases reside. IaCs like Terraform are also able to provision applications written in various different languages.

It follows that implementations of IaC use high-level descriptive coding language to automate the provisioning of IT infrastructure. This automation replaces conventional processes of manually provisioning and managing servers, operating systems, database connections, storage, and other infrastructure elements each time a software application is developed or deployed. As the number of applications produced and implemented continue to increase, and as infrastructure architecture continues to evolve with developer and user demands, IaC allows for automation of infrastructure in order to control costs, reduce risks, and respond with speed to new opportunities and threats.

IaC is thereby used to configure unique cloud services as requested. IaC is able to achieve these unique implementations by customizing the number and/or type of inputs that are provided at different stages of implementation, as described herein. The unique cloud services that are created may thereby provide access to an IaC execution environment that functions as requested by the user. Effectively, these IaC execution environments are virtual translations of the various physical systems that conventional products have resorted to creating for each user request.

Moreover, by implementing operations in method 400 below, the system 300 (more specifically the central server 304) is able to seamlessly onboard a number of applications in a multi-tenant infrastructure. Moreover, by using certain automations to integrate applications and other software in the multi-tenant infrastructure, approaches herein are able to significantly improve the efficiency by which a shared infrastructure is updated.

Figure 4A:
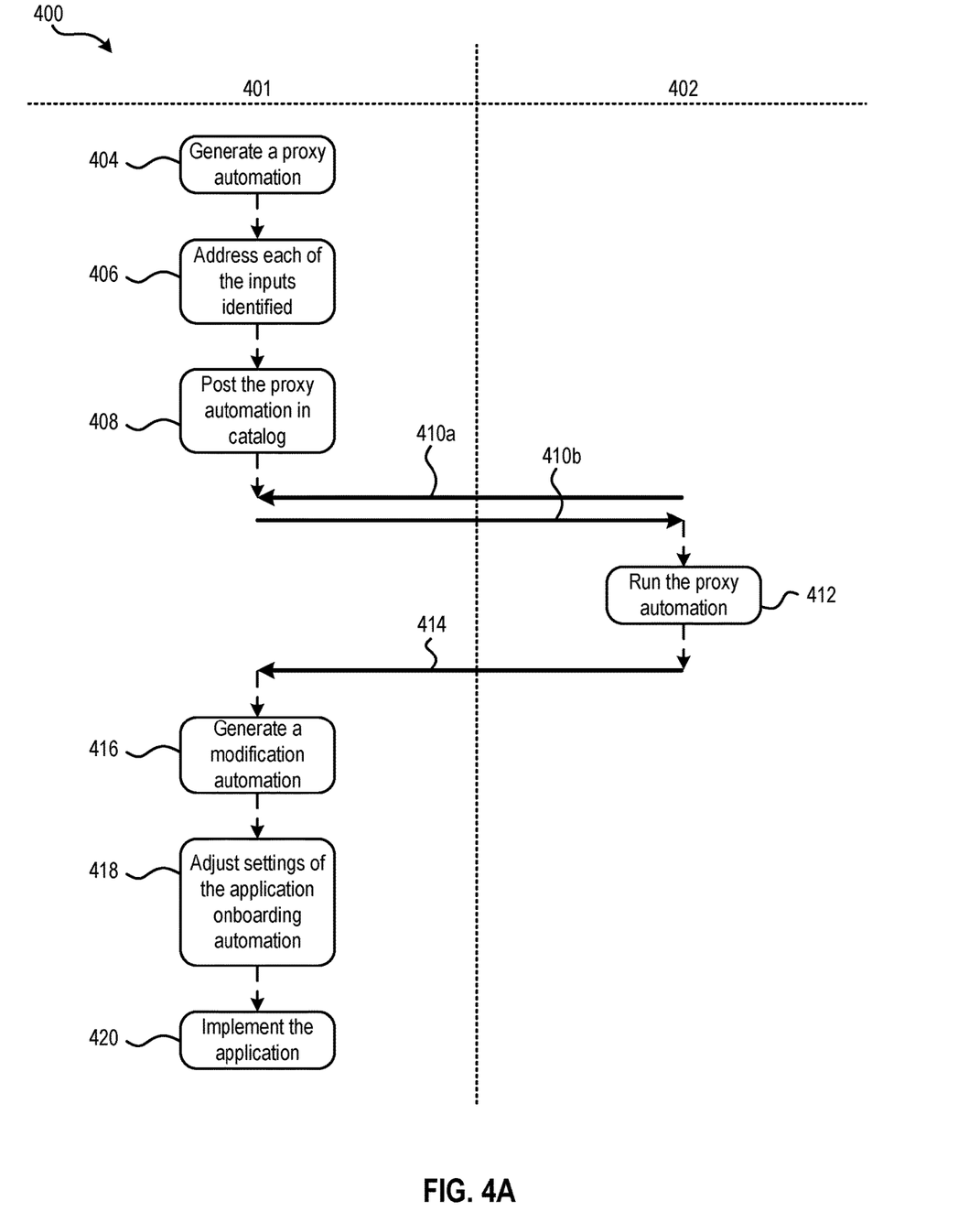
FIG. 4A is a flowchart of a method, in accordance with one embodiment.

Looking now to FIG. 4A, a method 400 for implementing proxy automation in multi-tenant infrastructure for application integration (e.g., onboarding) is illustrated in accordance with one embodiment. The method 400 may be performed in accordance with the present invention in any of the environments depicted in FIGS. 1-3, among others, in various embodiments. Of course, more or less operations than those specifically described in FIG. 4A may be included in method 400, as would be understood by one of skill in the art upon reading the present descriptions.

Each of the steps of the method 400 may be performed by any suitable component of the operating environment. For example, both of the nodes 401, 402 shown in the flowchart of method 400 may correspond to one or more processors positioned at a different location in a distributed compute system. Moreover, each of the one or more processors are preferably configured to communicate with each other.

In various embodiments, the method 400 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As mentioned above, FIG. 4A includes different nodes 401, 402, each of which represent one or more processors, controllers, computer, etc., positioned at a different location in a distributed data storage system. For instance, node 401 may include one or more processors located at a central compute location (e.g., main server) of a distributed compute system (e.g., see central server 304 of FIG. 3 above). Node 402 may include one or more processors located at a first edge compute location of a distributed compute system (e.g., see remote server 306 of FIG. 3 above). Accordingly, commands, data, requests, etc. may be sent between each of the nodes 401, 402 depending on the approach. Moreover, it should be noted that the various processes included in method 400 are in no way intended to be limiting, e.g., as would be appreciated by one skilled in the art after reading the present description. For instance, data sent from node 402 to node 401 may be prefaced by a request sent from node 401 to node 402 in some approaches.

Looking to FIG. 4A, method 400 includes operation 404. There, operation 404 involves creating an application onboarding automation. The application onboarding automation may ultimately be used to implement an application on a multi-tenant infrastructure. This may be achieved by modifying details of the application onboarding automation based on inputs (e.g., information) received pertaining to the application. As a result, the process of implementing the application at a given location is automated, thereby improving performance by reducing latency experienced.

Implementations herein are also able to improve the accuracy (e.g., deployment success) by which the resulting application is able to match the intentions of a user. Again, by providing access to certain ones of the design layers for an application, implementations herein ensure the inputs are entered by a target audience. However, these inputs can be reviewed, e.g., using a same automated review implemented in the application onboarding automation.

Further still, implementations herein allow users to self serve updates that relate to application deployment. In other words, the application onboarding automation may be updated (e.g., amended) by a user to implement changes in the resulting application and/or proxy automation described below. Similarly, implementations herein allow information about the resulting success of the application onboarding automation to be returned to the user, e.g., via proxy automation logs and other types of information that may be produced. Thus, in situations where the application onboarding automation execution is subject to approval, this information returned may be used to determine whether approval should be given, e.g., as will be described in further detail below.

It should also be noted that the type of application onboarding automation created at operation 404 may vary depending on the implementation. For instance, the resulting application and/or any intermediary aspects of the application (e.g., such as a proxy automation) may impact the type of application onboarding automation created and/or how the application onboarding automation is created.

According to an example, which is in no way intended to limit the invention, the application onboarding automation may include a terraform template. Accordingly, a terraform template may be used for the application onboarding automation. Similarly, terraform may be used as a part of the proxy automation. In one approach, terraform may be used to leverage a custom terraform provider to update the configuration of the application onboarding automation, or even the proxy automation in some instances. For instance, terraform modules are small and reusable for multiple infrastructure resources that are used together. Terraform modules are thereby useful because they allow complex resources to be automated with re-usable, configurable constructs. Writing even a simple terraform file results in a module, which can call other modules, which makes assembling configurations faster and more concise, e.g., as would be appreciated by one skilled in the art after reading the present description.

While the type of application onboarding automation implemented may vary, it is preferred that the automation identifies one or more inputs that are associated with performing the application onboarding automation. The process of implementing an application on a multi-tenant infrastructure typically involves providing input(s) that determine various operational aspects of the application. For example, information associated with one or more data paths, security protocols, verification procedures, communication channels, etc., may be entered for a given implementation. Depending on the approach, this information may be predetermined by an administrator (e.g., see administrator 312 in FIG. 3), based on previous settings, determined by industry standards, etc. In other approaches, the application information may be entered in real-time by a user (e.g., see user 324 in FIG. 3) in response to receiving a request to do so. For instance, one or more prompts may be sent out to a creator of an application, requesting certain types of information about the application. This information may be used to integrate the application in a multi-tenant infrastructure and form various details about the application.

From operation 404, method 400 proceeds to operation 406. There, operation 406 includes generating a proxy automation on a multi-tenant infrastructure. The proxy automation is preferably generated using the application onboarding automation created in operation 404. In other words, the inputs that are available in the proxy automation are derived from (e.g., correspond to) the inputs received as a result of the application onboarding automation. The proxy automation may thereby actually determine the inputs that are made available for user input in the application onboarding automation. Moreover, the specific number and/or types of inputs used in a given implementation may be held until approved and/or modified by an administrator.

For example, the application onboarding automation may be initiated by an administrator. As a result, the administrator may be given an opportunity to identify sources of input information identified in the automation. In other words, an administrator of the multi-tenant infrastructure may determine which information used in the application onboarding process is fixed, and identify inputs used in the application onboarding process which are entered by a user. With respect to the present description, information in the application onboarding process that is "fixed" may include any information (e.g., application settings, data locations, instructions, etc.) that is predetermined and set such that it may not be changed once the proxy automation is generated. This fixed information may thereby be set by an administrator. In comparison, the inputs that are entered by a user may include any type of text entry fields, selecting one of a predetermined set of options, prompts, etc., that may become available as a result of performing the proxy automation.

The type and amount of information that is fixed for a given implementation differs based on the application being implemented. Similarly, the amount of information that is entered by a user in real-time as a result of running the proxy automation also varies depending on the application being implemented. It follows that, while certain inputs may be provided by an individual attempting to introduce an application to the multi-tenant infrastructure (e.g., based on details of the given application), other inputs are predetermined by an administrator. While the predetermined inputs may be considered fixed for the application onboarding automation, these fixed inputs may be adjusted over time by an administrator, e.g., by updating hidden settings of the application onboarding automation and/or the multi-tenant infrastructure itself.

It follows that generating the proxy automation in operation 406 involves addressing each of the inputs identified by the application onboarding automation. For instance, the application onboarding automation may provide an administrator of the multi-tenant infrastructure the opportunity to set a number of input variables to be entered by a user, as well as a number of fixed variables. In other words, the administrator sets the number of inputs that are entered by a user, in addition to what information is preset. These inputs may even be received as a result of the proxy automation being run at the application location.

In other words, a user is able to submit values for the set number of inputs as a result of implementing the proxy automation. The administrator may thereby be able to generate a unique proxy automation by adjusting how information associated with an application is entered. However, it should be noted that one or more other automations may be used in some approaches to create the proxy automation.

Referring still to FIG. 4A, operation 408 includes causing the proxy automation to be posted in a catalog. Operation 408 may thereby include outputting (e.g., transmitting) the proxy automation to a shared catalog. In some implementations, the shared catalog is an IaC catalog. Accordingly, the automations listed in the catalog may be available to remote locations (e.g., servers) that are implementing one or more applications-also referred to herein as "application locations." In other words, the catalog may provide access to a variety of automations at different locations in a distributed system. According to an example, proxy automations are advertised in catalogs of infrastructure as code automations available be used by application developers, advertised on conventional websites, distributed over email, etc.

A request for a proxy automation is received at node 401 from the application location at node 402. See operation 410*a*. Moreover, operation 410*b* includes causing the proxy automation to be deployed to the application location at node 402 in response to receiving the request. Operation 412 further includes running the proxy automation at node 402. A proxy automation is thereby sent to, and performed at, a remote processing location. According to an example, a proxy automation can be formed by an administrator 312 on the multi-tenant (shared) infrastructure 302 of central server 304 in FIG. 3. The proxy automation may further be sent to one of the remote servers 306, 308 for implementation there by user 324 to integrate one or more applications on the multi-tenant infrastructure 302.

Returning to operation 412 of FIG. 4A, running the proxy automation at node 402 involves requesting information that corresponds to an application. The information that is requested and collected at a remote application server is transferred to the multi-tenant infrastructure for implementation. This allows for the multi-tenant infrastructure to be updated such that an application developed at a remote server may be seamlessly integrated into the multi-tenant infrastructure. In other approaches, the requested information is input into the proxy automation, whereby the proxy automation may be run, and information output as a result of running the proxy automation may be returned to the central server at node 401.

In some approaches operation 412 includes querying one or more users associated with the application for one or more inputs (e.g., selections) that pertain to the application. It follows that deploying the proxy automation at a remote server allows for the multi-tenant infrastructure to collect information that is helpful in performing integration of the application in the multi-tenant infrastructure.

As noted above the proxy automation may be generated using the application onboarding automation. Moreover, the application onboarding automation is developed by an administrator of the multi-tenant infrastructure by identifying certain inputs used in the application onboarding process that are to be entered by a user. These inputs may pertain to details of the corresponding application and may thereby be provided by a user that developed the application. Running the proxy automation may thereby involve providing a user with one or more prompts that request an input from the user. The prompts may be of any type depending on the approach, e.g., such as text entry boxes, multiple choice options, a field to upload one or more documents, etc.

It follows that an application owner adopts the proxy automation at an application location, enters values for each of the input variables and runs the proxy automation, finally sending the resulting values (information) to the multi-tenant infrastructure to be implemented along with the fixed variables. As noted above, at least some of this information gathered as a result of performing the proxy automation at the remote server, is returned to node 401. See operation 414. Again, proxy automations performed at remote locations may be used to collect information about applications and use that information to configure a multi-tenant infrastructure such that the corresponding applications can be seamlessly implemented at a central server. New instances of the application onboarding automation are thereby created as a result of running the proxy automation. Moreover, these new instances of the application onboarding automation may be stored in the shared infrastructure. For example, a pull request for the shared infrastructure automation repo may be generated, with any application specific and shared infrastructure specific variables entered.

In response to receiving inputs produced by performing the proxy automation at an application location for an application, method 400 proceeds to optional operation 416. There, optional operation 416 includes optionally generating a modification automation that is configured to adjust settings of the application onboarding automation. In other words, a modification automation is created in some situations using the information received as a result of performing the proxy automation at a remote location. Moreover, this modification automation may be used to create an application onboarding automation that is unique for an application being introduced to the multi-tenant infrastructure for implementation.

However, in some approaches the modification automation may not be generated at all. Rather, the modifications to the inputs of the application onboarding automation may be performed by the proxy automation itself. Accordingly, no additional automation is involved with the process. It follows that simply running the proxy automation (as seen in operation 412 above) is able to implement updates.

It follows that the proxy automation does not actually deploy the application, but rather configures the application onboarding automation in the devops systems of the multi-tenant infrastructure (e.g., such as an automation git repo). As a result, an admin of the shared infrastructure may only approve the application onboarding request in order to deploy the application at the shared infrastructure, e.g., as described in additional detail below.

It should also be noted that although the modification automation is shown in method 400 as being generated using the information received as a result of the proxy automation being performed at node 402, the modification automation may actually be generated in some approaches such that the information received as a result of the proxy automation being performed may simply be input into the modification automation. As different values are input into the modification automation, the result may simply update based on the new values input. Accordingly, the modification automation may be formed (e.g., constructed) and used to process a variety of information input.

Operation 418 further includes using the received inputs and the new automation to adjust settings of the application onboarding automation. The adjustments made to the application onboarding automation may thereby correspond to a particular application being implemented. These adjustments to the application onboarding automation are preferably based at least in part on inputs that are received as a result of running the proxy automation for the particular application. The application onboarding automation may thereby be implemented at a multi-tenant infrastructure with a configuration that corresponds to inputs and predetermined (e.g., coded) information identified as a result of performing the proxy automation at a remote server for the application.

Accordingly, operation 420 includes automatically implementing the application on the multi-tenant infrastructure. This may be achieved by performing the adjusted application onboarding automation from operation 418 at the multi-tenant infrastructure. As noted above, the adjusted application onboarding automation is formed using the received inputs and the new automation to adjust settings of the application onboarding automation. The adjusted application onboarding automation may thereby have a unique configuration that allows for an application, corresponding to the adjustments made, to be automatically integrated with the multi-tenant infrastructure. Again, the adjusted application onboarding automation may include desired data paths, storage locations, security protocol(s), verification procedures, communication channels, etc., that may be used for a given implementation.

Figure 4B:
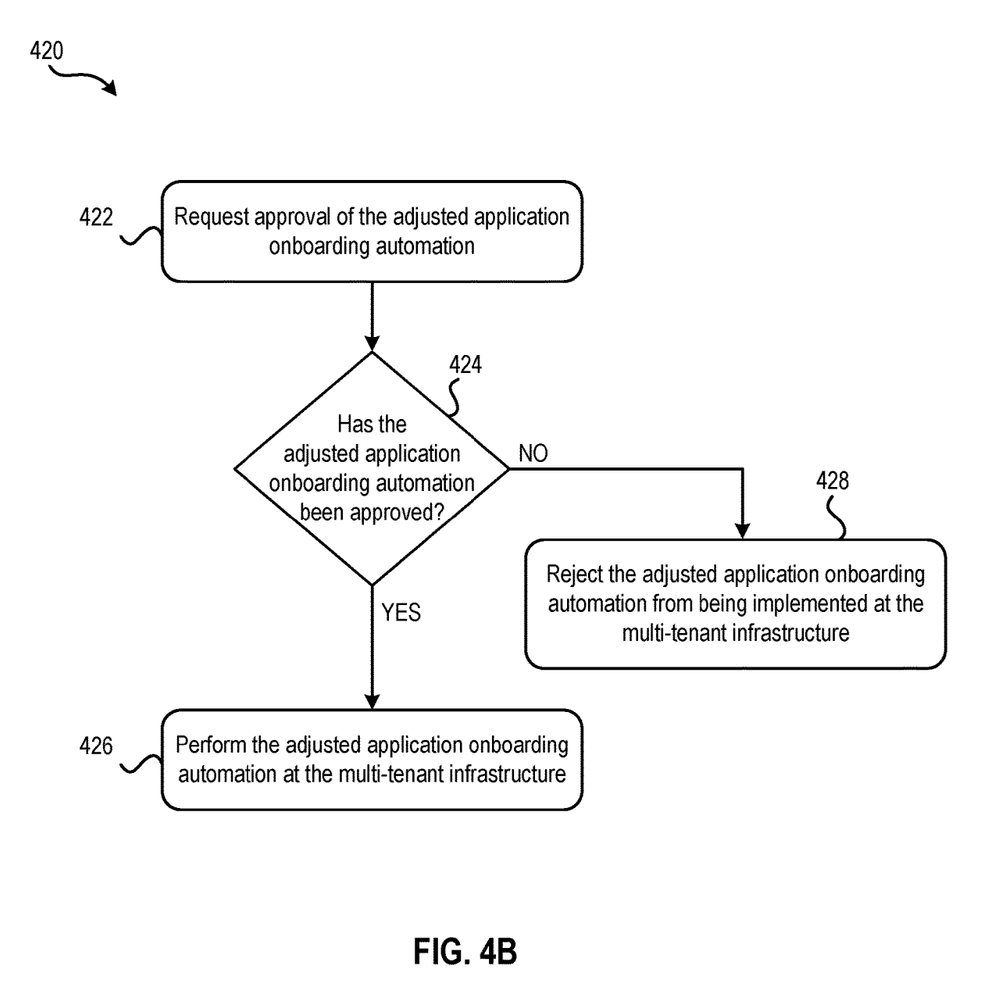
FIG. 4B is a flowchart of sub-operations which involve the operations in the method of FIG. 4A, in accordance with one embodiment.

Accordingly, FIG. 4B shows exemplary sub-operations of implementing a software application on a multi-tenant infrastructure, in accordance with one embodiment. Accordingly, one or more of the sub-operations may be used to determine whether performing operation 420 of FIG. 4A is desirable given the current situation. However, it should be noted that the sub-processes of FIG. 4B are illustrated in accordance with one embodiment which is in no way intended to limit the invention.

As shown, sub-operation 422 of FIG. 4B includes requesting approval of the adjusted application onboarding automation. Although certain adjustments may be made to the application onboarding automation, they may interfere with existing (e.g., pending) operations. Moreover, certain changes to the application onboarding automation may result in reduced performance (e.g., efficiency). Requesting approval of a change proposed to an application onboarding automation may thereby be sent to an administrator of the multi-tenant infrastructure. The administrator is able to evaluate the requested changes and determine whether they will result in a desirable (e.g., successful) outcome. According to one example, which is in no way intended to limit the invention, requesting approval of an adjusted application onboarding automation includes sending a pull request to an administrator of the multi-tenant infrastructure, the pull request being for the adjusted application onboarding automation.

Sub-operation 424 includes determining whether the adjusted application onboarding automation has been approved. In response to determining that the adjusted application onboarding automation has been approved, the flowchart proceeds to sub-operation 426. There, sub-operation 426 includes performing the adjusted application onboarding automation at the multi-tenant infrastructure. As a result, the corresponding application may be automatically implemented at the multi-tenant infrastructure for continued use.

However, in response to determining that the adjusted application onboarding automation has not been approved, the flowchart proceeds to sub-operation 428. There, sub-operation 428 includes rejecting the adjusted application onboarding automation from being implemented at the multi-tenant infrastructure. In some approaches, a warning may be returned to the remote server that performed the proxy automation which produced the adjusted application onboarding automation. In other approaches, an administrator may adjust the changes that were made to the application onboarding automation (e.g., by editing internal variables). Moreover, these changes may be merged to successfully onboard the application, e.g., as would be appreciated by one skilled in the art after reading the present description.

It follows that operations and sub-operations of method 400 are desirably able to integrate applications in a multi-tenant (shared) infrastructure efficiently by creating and running different automations. These automations include details that correspond to the applications, thereby allowing for a multi-tenant infrastructure to efficiently exchange information with a number of remote locations. This improves the performance of the overarching system by allowing application developers to rapidly and efficiently deploy applications at a shared location, thereby reducing latency experienced.

It should also be noted that the number of applications implemented in a given multi-tenant infrastructure varies depending on the approach. For instance, the size (e.g., storage capacity, processing capacity, etc.) of the multi-tenant infrastructure may impact the number and/or type of applications that are implemented there.

In some embodiments, a multi-tenant infrastructure may also use one or more machine learning models to implement a new application therein. For instance, a machine learning model (e.g., a neural network) may be trained using labeled and/or unlabeled data corresponding to other applications being implemented in a multi-tenant infrastructure. Over time, the machine learning model may thereby be able to identify how different applications interact with a multi-tenant infrastructure. This understanding will allow the machine learning model to determine a most efficient way to implement an application in a multi-tenant infrastructure from a remote location. This may be true even in situations where some or all of the information gathered as a result of performing the proxy automation at a remote server is unavailable (e.g., lost).

Again, embodiments herein are able to adopt automations that allow for self-serve onboarding use case for applications. As noted above, conventional products have required manually developing new mechanisms for each application which has been significantly inefficient. In sharp contrast, implementations herein are even flexible as to what information is derived from the underlying onboarding automation. Thus, the implementations herein are able to adapt to a wide variety of applications of the onboarding automation. In other words, the improvements achieved by the implementations herein are applicable to a variety of different forms or instances of shared infrastructure. Moreover, implementations herein are able to also adapt to changing settings and/or conditions over time. For example, an application owner may be able to update the application onboarding process by simply adjusting the input variables and re-running the proxy automation.

Further still, implementations herein are able to preserve a separation between application owners and the infrastructure administrators, which allows for security measures to be implemented. For example, an application owner may be responsible for specifying application specific inputs, but is not given access to the shared infrastructure directly. The infrastructure admin may retain control of approving application deployment, control over the actual shared infrastructure, and any inputs related to the internal workings of the shared infrastructure.

As noted above, implementations herein are also able to improve the accuracy (e.g., deployment success) by which the resulting application is able to match the intentions of a user. Again, by providing access to certain ones of the design layers for an application, implementations herein ensure the inputs are entered by a target audience. However, these inputs can be reviewed, e.g., using a same automated review implemented in the application onboarding automation.

Further still, implementations herein allow users to self serve updates that relate to application deployment. In other words, the application onboarding automation may be updated (e.g., amended) by a user to implement changes in the resulting application and/or proxy automation described below. Similarly, implementations herein allow information about the resulting success of the application onboarding automation to be returned to the user, e.g., via proxy automation logs and other types of information that may be produced. Thus, in situations where the application onboarding automation execution is subject to approval, this information returned may be used to determine whether approval should be given.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    generating a proxy automation on a multi-tenant infrastructure using an application onboarding automation;
    generating a new automation configured to adjust settings of the application onboarding automation based on inputs received in response to running the proxy automation;
    receiving inputs in response to the proxy automation being run at an application location for an application;
    using the received inputs and the new automation to adjust settings of the application onboarding automation; and
    implementing the application on the multi-tenant infrastructure by performing the adjusted application onboarding automation at the multi-tenant infrastructure.

2. The computer-implemented method of claim 1, wherein implementing the application on the multi-tenant infrastructure includes:
    requesting approval of the adjusted application onboarding automation from an administrator of the multi-tenant infrastructure; and
    in response to receiving approval from the administrator, performing the adjusted application onboarding automation at the multi-tenant infrastructure.

3. The computer-implemented method of claim 2, wherein requesting approval of the adjusted application onboarding automation includes sending a pull request to the administrator of the multi-tenant infrastructure.

4. The computer-implemented method of claim 1, wherein generating the proxy automation on the multi-tenant infrastructure includes:
    processing the application onboarding automation; and
    setting (i) a number of input variables, and (ii) a number of fixed variables.

5. The computer-implemented method of claim 4, wherein generating the proxy automation on the multi-tenant infrastructure includes:
    adjusting the values of at least some of the fixed variables over time by updating hidden settings,
    wherein the inputs received in response to the proxy automation being run at the application location include values for the set number of input variables.

6. The computer-implemented method of claim 1, comprising:
    causing the proxy automation to be posted as code automations in a catalog available to the application location; and
    causing the proxy automation to be deployed to the application location in response to receiving a request from the application location,
    wherein the application location and the multi-tenant infrastructure are at different locations that are configured to communicate with each other over a network.

7. The computer-implemented method of claim 1, wherein the multi-tenant infrastructure includes infrastructure as code.

8. The computer-implemented method of claim 1, wherein multiple applications are implemented on the multi-tenant infrastructure.

9. The computer-implemented method of claim 8, wherein between 10 and 20 different applications are implemented on the multi-tenant infrastructure.

10. A computer program product, comprising a computer readable storage medium having program instructions embodied therewith, the program instructions readable by a processor, executable by the processor, or readable and executable by the processor, to cause the processor to:
    generate a proxy automation on a multi-tenant infrastructure using an application onboarding automation;
    generate a new automation configured to adjust settings of the application onboarding automation based on inputs received in response to running the proxy automation;
    cause the proxy automation to be deployed to an application location;
    cause the proxy automation to be run at the application location;
    receive inputs from the application location in response to the proxy automation being run at the application location;
    use the received inputs and the new automation to adjust settings of the application onboarding automation; and
    implement the application on the multi-tenant infrastructure by performing the adjusted application onboarding automation at the multi-tenant infrastructure.

11. The computer program product of claim 10, wherein implementing the application on the multi-tenant infrastructure includes:
    requesting approval of the adjusted application onboarding automation from an administrator of the multi-tenant infrastructure; and
    in response to receiving approval from the administrator, performing the adjusted application onboarding automation at the multi-tenant infrastructure.

12. The computer program product of claim 11, wherein requesting approval of the adjusted application onboarding automation includes sending a pull request to the administrator of the multi-tenant infrastructure.

13. The computer program product of claim 10, wherein generating the proxy automation on the multi-tenant infrastructure includes:
    processing the application onboarding automation to set (i) a number of input variables, and (ii) a number of fixed variables.

14. The computer program product of claim 13, wherein the inputs received in response to the proxy automation being run at the application location include values for the set number of input variables.

15. The computer program product of claim 10, wherein the program instructions are readable and/or executable by the processor to cause the processor to:
cause the proxy automation to be posted in a catalog available to the application location; and
cause the proxy automation to be deployed to the application location in response to receiving a request from the application location.

16. The computer program product of claim 10, wherein the multi-tenant infrastructure includes infrastructure as code.

17. The computer program product of claim 10, wherein multiple applications are implemented on the multi-tenant infrastructure.

18. The computer program product of claim 17, wherein between 10 and 20 different applications are implemented on the multi-tenant infrastructure, wherein the application location is on a remote server that is configured to communicate with the processor on a network.

19. A system, comprising:
a multi-tenant infrastructure having infrastructure as code;
a processor; and
logic integrated with the processor, executable by the processor, or integrated with and executable by the processor, the logic being configured to:
generate a proxy automation on a multi-tenant infrastructure using an application onboarding automation;
generate a new automation configured to adjust settings of the application onboarding automation based on inputs received in response to running the proxy automation;
receive an automation request from an application location on a remote server;
cause the proxy automation to be deployed to the application location;
cause the proxy automation to be run at the application location;
receive inputs in response to the proxy automation being run at the application location;
use the received inputs and the new automation to adjust settings of the application onboarding automation; and
implement the application on the multi-tenant infrastructure by performing the adjusted application onboarding automation at the multi-tenant infrastructure.

20. The system of claim 19, wherein implementing the application on the multi-tenant infrastructure includes:
requesting approval of the adjusted application onboarding automation from an administrator of the multi-tenant infrastructure; and
in response to receiving approval from the administrator, performing the adjusted application onboarding automation at the multi-tenant infrastructure,
wherein between 10 and 20 different applications are implemented on the multi-tenant infrastructure.

\* \* \* \* \*